United States Patent

[11] 3,598,069

| [72] | Inventors | John C. Hatcher<br>7525 Valley Brook Drive, Charlotte, N.C. 28211;<br>Ferrel Sansbury, 2934 Temple Lane, Charlotte, N.C. 28205 |
|---|---|---|
| [21] | Appl. No. | 779,034 |
| [22] | Filed | Nov. 26, 1968 |
| [45] | Patented | Aug. 10, 1971 |

[54] PLANTER WITH INDEPENDENTLY MOVABLE PRESS WHEEL AND FURROW OPENER
4 Claims, 4 Drawing Figs.

[52] U.S. Cl. .................................................. 111/85, 111/62
[51] Int. Cl. .................................................. A01c 5/06, A01b 49/06
[50] Field of Search........................................... 111/83-–85, 62.66, 52—56, 62—65; 172/611

[56] References Cited
UNITED STATES PATENTS

| 414,420 | 11/1889 | Lindsley | 111/83 X |
|---|---|---|---|
| 681,037 | 8/1901 | Carney | 111/84 X |
| 1,318,365 | 10/1919 | Erway | 111/84 UX |
| 2,361,083 | 10/1944 | Burnett | 111/84 |
| 2,563,172 | 8/1951 | Hyland et al. | 111/54 |
| 2,981,213 | 4/1961 | O'Neil | 111/64 |
| 3,022,754 | 2/1962 | Sorensen et al. | 111/63 X |

*Primary Examiner*—Robert E. Bagwill
*Attorney*—Parrott, Bell, Seltzer, Park & Gibson ABSTRACT: An agricultural seed planter in which independent mounting of a press wheel means and a planting furrow opening means facilitates movement of the planter over uneven ground while mounting of a seed dispensing means, for depositing seed into a planting furrow opened by the furrow opening means, to overlie the press wheel means imposes a gravitational force downward thereon to aid in maintaining traction and in tamping furrows into which seed has been dropped.

INVENTOR:
JOHN C. HATCHER
and FERREL SANSBURY

BY Parrott, Bell, Seltzer, Park & Gibson

ATTORNEYS

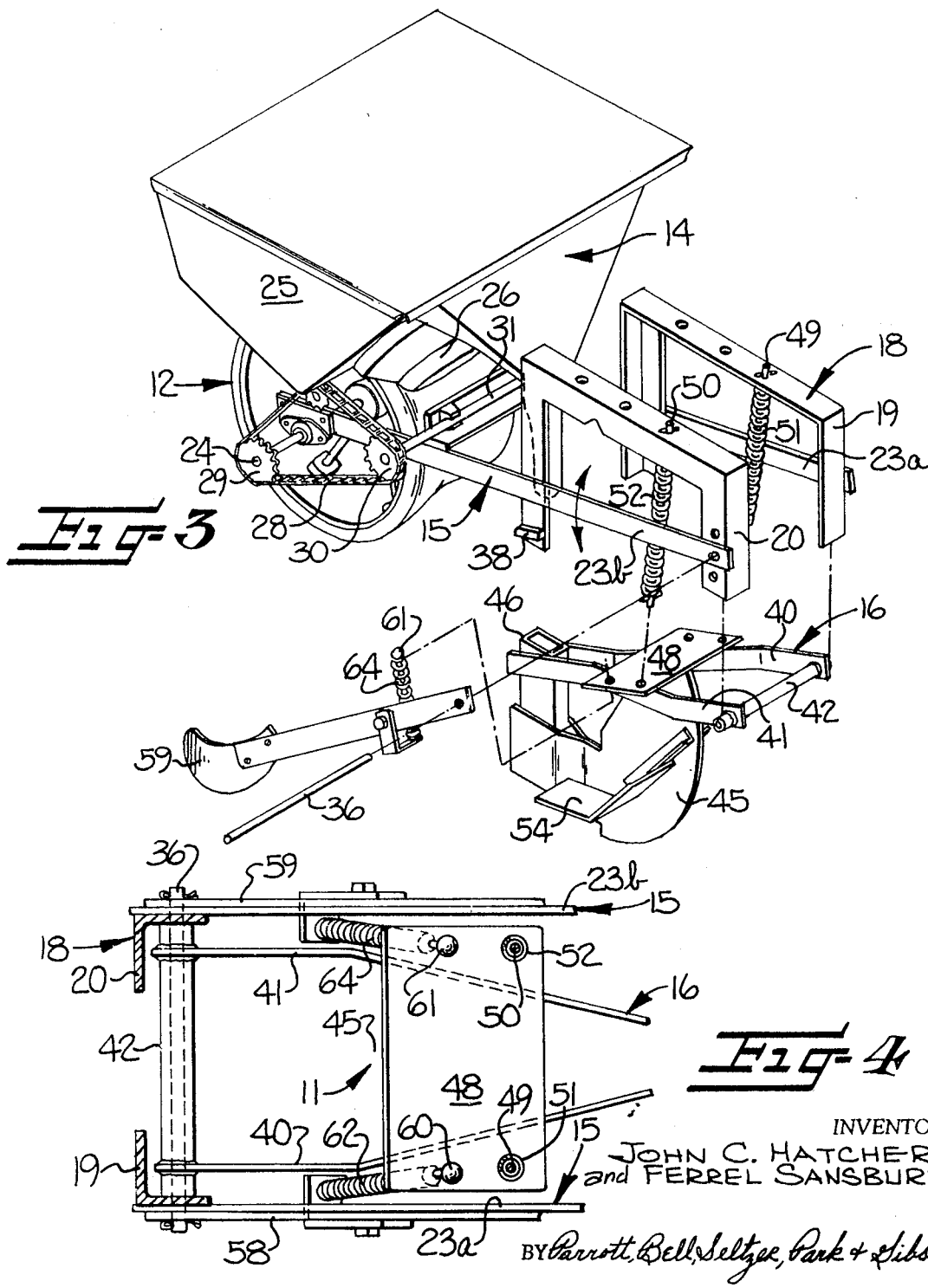

PLANTER WITH INDEPENDENTLY MOVABLE PRESS WHEEL AND FURROW OPENER

One of the problems to be met by agricultural planters arises from the use of such planters to plant uneven ground. Thus, a successful planter must accommodate movement of its elements such as occurs when the implement is traversed across rolling, nonlevel, or uneven terrain while still continuing to perform satisfactorily its intended function of planting seed in a controlled manner.

Heretofore, accommodation of an agricultural seed planter to use over uneven ground has been approached by constructing the planter so that only a minimal number of its elements move vertically as uneven ground is traversed. Typically, this approach has led to vertical movement of a furrow opening means, such as s sword or a pair of discs, and a furrow press wheel which tamps the furrow closed after seed has been deposited therein, with a hopper and seed dropping means being mounted either on a main frame and immovable relative to the other planter elements or on the furrow opening means for movement therewith. While such an arrangement may accommodate movement of the planter over uneven ground, the construction of the planter is made more complicated and the possibilities of breakdown are increased by the necessities that loading means be provided to bias the furrow opening and press wheel means into engagement with the surface of the ground being traversed and that a drive arrangement be provided for operatively connecting the seed dispensing means and the press wheel so that seed is dropped in predetermined relation to movement of the planter over the ground being sown.

With the above difficulties and problems in mind, it is an object of the present invention to provide an agricultural seed planter wherein free movement over uneven ground is facilitated while improved covering and tamping of planted seed is obtained and the construction and maintenance problems heretofore encountered are avoided. In realizing this object of the present invention, proper tamping of planted seed is obtained without requiring spring loading means acting downwardly on the press wheel of an agricultural planter and a simplified drive arrangement insures dispensing of seed in proper coordination to movement of planter over the terrain being planted. These simplifications of planter structure lead to reduced maintenance and more sturdy construction of such an implement, and are realized by an arrangement wherein the seed dispensing means is mounted with the press wheel means on a movable subframe, to overlie the same and move therewith on traversal of uneven ground.

Some of the objects of the invention having been stated, other objects will appear as the description proceeds, when taken in connection with the accompanying drawings, in which FIG. 1 is a perspective view of a planter constructed in accordance with the present invention;

FIG. 3 is an exploded perspective view of certain elements of the planter of FIG. 1; and FIG. 4 is a plan view, in partial section, of certain elements of the planter of FIGS. 1 through 3, taken generally along the line 4—4 in FIG. 2.

Figure 1:
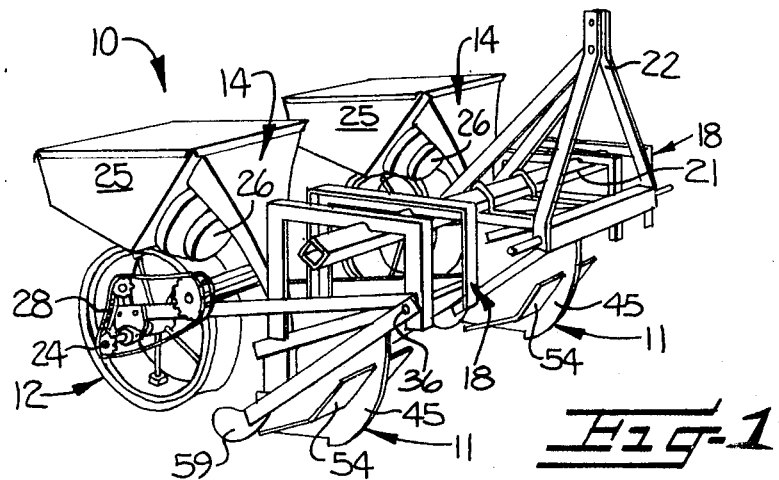
Figure 2:
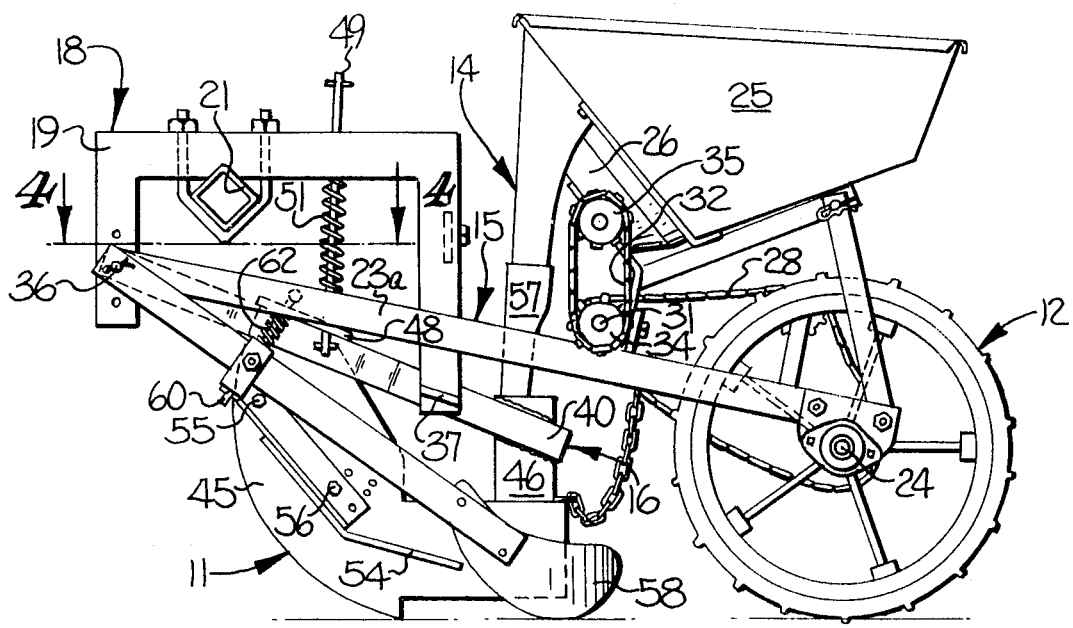
FIG. 2 is an enlarged elevation view of the planter of FIG. 1.

Referring now more specifically to the drawings, an agricultural seed planter in accordance with the present invention is there shown and generally identified by the reference character 10. While the present invention has been illustrated in a planter for two-row planting, it is contemplated that the present invention is equally applicable to single row or to other multirow planters and that such modifications may be made as are necessary to accommodate the planter to such operation within the scope of the present invention. Further, it is contemplated that the manner of supporting the planter 10 and traversing the same over ground to be planted may be varied from the particular manner shown when and as required to accommodate use of the planter with various agricultural propelling and tilling machines.

Although the planter 10 is particularly constructed for two-row planting, the following discussion will proceed particularly with reference to those elements which are used in planting a single row, it being understood that these elements are duplicated as required to plant multirows. The basic elements of the planter 10 include planting furrow opening means generally identified by the reference character 11, press wheel means generally identified by the reference character 12, and seed dispensing means generally identified by the reference character 14. These basic elements cooperate one with another to open a seed receiving furrow in ground traversed by the planter 10, deposit seed into the open furrow, and press the furrow closed while tamping the ground above the planted seed. As arranged to perform these functions, the basic elements are supported upon frame members of the planter 10 including first and second trailing frame means 15 and 16 and a main frame 18. The main frame 18 is particularly adapted for connection to an agricultural propelling or towing machine such as a tractor. In particular, the main frame 18 includes a pair of channel members 19 and 20 forming a generally boxlike frame structure and a crossbar 21 extending laterally therebetween and configured for engagement with the hitch arrangement of an agricultural machine, as by means of a three-point hitch 22. Where a three-point hitching arrangement is used between the main frame and a tractor, the planter 10 is brought into engagement with the surface of ground to be planted and is raised from engagement therewith for transportation between fields by operation of the tractor hydraulic system. Other known hitching arrangements are readily adaptable to the structural arrangement of the planter 10 as described hereinafter.

In accordance with an important feature of this invention, the press wheel means 12 and seed dispensing means 14 are mounted together on the first frame means 15 for vertical movement upon engagement with surface irregularities in the ground being traversed. The first frame means or first trailing frame 15 is defined by a pair of trailing arm members 23a and 23b which extend parallel one to another and mount the press wheel means 12 adjacent a free rearward end thereof for rotation about an axis defined by an axle 24. The press wheel means 12 comprises a generally well known spoked wheel arrangement, preferably provided with a low pressure or solid elastomeric tire having a lugged tread configuration thereon.

The seed dispensing means 14 includes a hopper 25 for receiving seed to be planted and a seed plate means 26 disposed adjacent the lower side of the hopper 25 and including a moving chamber for trapping seed and dispensing the same in predetermined relation to rotation of the seed plate means 26. While constructions of this general type are conventional in agricultural seed planters, it is distinctive of the planter 10 of the present invention that the seed dispensing means 14 is mounted to overlie the press wheel means 12 and moves vertically with the first trailing frame 15. This arrangement provides significant advantages of traction and firmer tamping to be discussed more fully hereinafter, and also has significance regarding the relative angular movement of the first and second trailing frames 15 and 16 and between the opening means 11 and seed dispensing means 14.

In order to drive a portion of the seed plate means 26 in rotation, for the dispensation of seed from the hopper 25, an operative connection is provided between the dispensing means 14 and the press wheel means 12. This connection is in the form of an endless chain 28 extending between a pair of sprockets 29 and 30 respectively fixed to the axle 24 revolving with the press wheel 12 and to a cross-shaft 31. The cross-shaft 31 is operatively connected with the seed plate means 26 by a second endless chain 32 extending between a pair of sprockets 34 and 35.

The positioning of the seed dispensing means 14 on the first trailing frame 15 insures that the center-to-center distances between the pairs of sprockets 29 and 30 and 34 and 35 are fixed and remain constant during use of the planter 10, even though the planter may traverse uneven ground. This arrangement is distinct from that conventionally used with other agricultural seed planters, wherein it is necessary to provide a biased, floating, idler wheel to take up slack in the drive chain occurring as the press wheel means moves vertically in accommodation of unevenness in ground being planted.

By positioning the seed dispensing means 14 to overlie the press wheel means 12, loading of seed into the hopper 25 of the seed dispensing means imposes a gravitational force downwardly on the press wheel means 12. Such a gravitational force results in greater assurance of covering and tamping the seed dropped into a furrow opened by the furrow opening means 11, thereby avoiding the necessity of providing spring biasing or loading for the press wheel means, and also insures traction between the press wheel means and the ground for maintenance of proper spacing of seed dropped by the seed dispensing means 14.

In the illustrated embodiment, free movement of the press wheel means 12 and seed dispensing means 14 is attained by mounting the first frame means 15 from the main frame 18 with a pivot pin 36. The pivot pin 36 penetrates the forward ends of the arms 23a and 23b of the first trailing frame 15 and also passes through a selected one of a series of mounting openings provided in the downwardly extending forward legs of the channel members 19 and 20 of the main frame 18. The plurality of pairs of openings are provided in the channel members 19 and 20 in order to permit an operator of the planter 10 to select a location for the pivotal axis about which the first trailing frame 15 moves which permits proper cooperation with the particular operator's towing machine and on traversal of the ground being planted. Lifting of the press wheel means 12 from the surface of the ground, for transfer of the planter 10 from field-to-field or as required, is insured by providing stop members 37 and 38 on the rearward downwardly extending legs of the channel members 19, 20. Thus, on lifting the main frame 18, downward movement of the first trailing frame 15 beyond the limit blocks or stops 37 and 38 is precluded.

The furrow opening means 11 is mounted by the second frame means 16 for vertical movement independently of the first frame means 15 and of the press wheel means 12, so that the gravitational force acting downwardly on the press wheel is not transferred to and does not act on the furrow opening means. In particular, the second frame means or trailing frame 16 is of generally Y-shaped bifurcated configuration, and includes a pair of arm members 40 and 41 joined adjacent their forward extremity by a bearing tube 42. In the illustrated embodiment, the length of the bearing tube 42 is appropriate for insertion between the channel members 19 and 20 of the main frame 18, and the bearing tube 42 receives therewithin the pivot pin 36. Thus, the pivotal axes about which the first and second frame means 15 and 16 of the illustrated embodiment move are a common axis as defined by the pivot pin 36.

Mounted from the second frame means 16 and depending therefrom is a furrow opening means, illustrated in the form of a sword member 45. The sword member 45 has a sharpened forward end for opening a seed receiving furrow in ground being planted and includes a rearward portion 46 defining a seed passage through which seeds dropped from the seed dispensing means 14 pass in being planted. The furrow opening means 11 is mounted to the second frame means 16 by welding of the seed passage portion 46 of the sword 45 between the free rearward ends of the trailing arms 40 and 41, and by means of a platform member 48 overlying and secured to the trailing arms 40 and 41 intermediate their length.

The platform 48 serves additional functions, as providing a lifting point to restrain the second frame means 16 against excessive downward movement upon the planter being raised for transport between fields. More particularly, a pair of pinned rod restraining members 49 and 50 extend between the channel members 19 and 20 of the main frame 18 and the platform 48, penetrating both members. By means of pins above the channel members 19 and 20 and below the plate 48, the extent to which the second frame 16 and the furrow opening means 11 may drop on lifting of the planter 10 is controlled by the length of the stop rods 49 and 50.

Additionally, each of the rods 49 and 50 has a compression spring 51 and 52 wound thereabout, for imposing a downward force on the platform 48 and thus on the furrow opening means 11 in the event that the second frame 16 is moved sharply upward. Such a downward biasing force insures that excessive hop or bounce of the furrow opening means 11 does not occur and that continued formation of a furrow in a ground being planted is obtained.

In order to control the depth at which seed are planted by the furrow opening means 11 in ground traversed by the planter 10, a sled plate 54 is provided and is adjustably mounted on the sword 45 for movement about a pivot bolt 55, on removal of an adjusting bolt 56. By engaging a relatively large area of ground adjacent the furrow opened by the sword 45, the sled plate 54 controls the depth of penetration of the sword into the ground. Additionally, the weight of the sled together with the weight of the sword provides a downward bias normally insuring the formation of the furrow in the ground being traversed.

It is to be noted that the furrow opening means 11 is secured to the second frame means 16 for movement at a distance from the pivotal axis thereof which is less than the distance separating the pivotal axis of the first frame means 15 and the press wheel means 12. This difference in pivotal movement arms results in a smaller angle arcuate movement for the first frame 15 as compared to the second frame 16 upon lifting of the free rearward ends thereof to the same vertical height. This is a factor in maintaining continuous communication of the seed dropping means 26 with the seed passage 46 through the sword 45, by avoiding distortion of an elastomeric conduit member 57 extending therebetween.

In addition to the basic elements of the planter 10, it is additionally contemplated that covering means may be provided in order to insure that seed dropped by the seed dispensing means 14 into a furrow opened by the furrow opening means 11 is properly covered before the furrow is tamped closed by the press wheel means 12. This function is served by a pair of spoon coverers 58 and 59, mounted for pivotal movement about the axis defined by the pin 36. Extending rearwardly from the pivotal axis to a point adjacent the rearward edge of the furrow opening means 11, the spoon coverers 58 and 59 serve to throw a portion of the earth traversed by the planter 10 inwardly toward the furrow after seed has been deposited therein, in order to insure that the seed is properly covered to be tamped by the press wheel means 12. A lifting or downward biasing force, as required for acting on the spoon coverers 58 and 59, is provided by guide pins 60 and 61 and compression springs 62 and 64 acting between the crossplate 28 of the second trailing frame 16 and corresponding ones of the coverers 58 and 59.

From the above discussion, it is to be seen that an agricultural seed planter has been disclosed wherein movement of elements of the planter is readily accomplished for permitting the planter to traverse uneven ground while continuing to perform the desired seed planting function. In addition, proper spacing of planted seed is maintained and the tamping thereof improved by the imposition of a gravitational force on the press wheel means, through mounting of the seed hopper and seed plate means to overlie and move with the press wheel means. At the same time, independent movement of the furrow opening means is obtained by mounting the same on an independent frame means. While it has been discovered that the planter arrangement of this invention is particularly advantageous in four- and six-row planters, in that the individually independent movement of the elements planting each of the rows compensates for variations in relative elevations during contour or side hill planting or in planting across terraced ground, the advantages of this invention are realized in planters for any number of rows.

In the drawings and specification there has been set forth a preferred embodiment of the invention and although specific terms are employed, they are used in a generic and descriptive sense only and not for purposes of limitation, the scope of the invention being defined in the claims:

We claim:

1. In an agricultural seed planter adapted to be connected with a propelling machine such as a tractor and including a main frame, planting furrow opening means for opening a furrow in ground traversed by the planter, press wheel means for closing a furrow opened by said opening means and for covering seed planted therein, and seed dispensing means including a seed storage hopper and seed dropping means operatively connected to said press wheel means to be driven thereby for depositing seed into a planting furrow opened by said opening means prior to closure of the furrow by said press wheel means, the improvement therewith comprising:

first trailing frame means having a forward end mounted from said main frame for movement about a pivotal axis and a free rearward end movable vertically upon traversal of surface irregularities in the ground being planted, said first frame means mounting said press wheel means for rotation about a generally horizontal axis and mounting said seed dispensing means, second trailing frame means having a forward end mounted from said main frame for movement about said pivotal axis and a free rearward end movable vertically independently of said first frame means, said second frame means mounting said furrow opening means, a pair of covering spoons mounted from said main frame for pivotal movement about said pivotal axis independently of said furrow opening and press wheel means and extending rearwardly and downwardly from said pivotal axis for engaging ground traversed by said furrow opening means and displacing the same to cover seed deposited in a planting furrow prior to closure of the furrow by said press wheel means, and said seed storage hopper imposing a gravitational force downwardly on said press wheel means independently of any downward force on said furrow opening means and to aid in maintaining traction of said press wheel means and in tamping closed furrows into which seed has been dropped.

2. In an agricultural seed planter adapted to be connected with a propelling machine such as a tractor and including a main frame, planting furrow opening means for opening a furrow in ground traversed by the planter, press wheel means for closing a furrow opened by said opening means and for covering seed planted therein, and seed dispensing means including a seed storage hopper and seed dropping means operatively connected to said press wheel means to be driven thereby for depositing seed into a planting furrow opened by said opening means prior to closure of the furrow by said press wheel means, the improvement therewith comprising:

first trailing frame means having a forward end mounted from said main frame for movement about a pivotal axis and a free rearward end movable vertically upon traversal of surface irregularities in the ground being planted, said first frame means mounting said press wheel means for rotation about a generally horizontal axis and mounting said seed dispensing means with said seed storage hopper vertically above and overlying said horizontal axis and said seed dropping means forwardly of said horizontal axis and generally overlying said furrow opening means, and second trailing frame means shorter than said first trailing frame means and having a forward end mounted from said main frame for movement about said pivotal axis and a free rearward end movable vertically independently of said first frame means, said second frame means mounting said furrow opening means, said seed storage hopper imposing a gravitational force downwardly on said press wheel means independently of any downward force on said furrow opening means and to aid in maintaining traction of said press wheel means and in tamping closed furrows into which seed has been dropped.

3. A planter according to claim 2 wherein said press wheel means is mounted on said first trailing frame means at a first predetermined distance rearwardly of the forward end thereof and said furrow opening means is mounted on said second trailing frame means at a second predetermined distance rearwardly of the forward end thereof, said first distance being greater than said second distance so that the angular movement of said first trailing frame is less than that of said second trailing frame on the free rearward ends thereof rising to a common height in traversing ground being planted.

4. A planter according to claim 2 further comprising depth limiting means including a sled member mounted on said furrow opening means for riding on the surface of ground being planted and spring biasing means acting on said furrow opening means to impose a loading force thereon upon the same being lifted on traversal of irregularities in ground being traversed and thereby insure proper penetration into ground being planted.